(12) United States Patent
Aida et al.

(10) Patent No.: US 10,916,983 B2
(45) Date of Patent: Feb. 9, 2021

(54) PERMANENT-MAGNET MOTOR

(71) Applicant: Mitsubishi Electric Corporation, Tokyo (JP)

(72) Inventors: Hiroshi Aida, Tokyo (JP); Masafumi Okazaki, Tokyo (JP); Satoru Akutsu, Tokyo (JP); Yoshihito Asao, Tokyo (JP); Yuji Takizawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 105 days.

(21) Appl. No.: 16/066,337

(22) PCT Filed: May 10, 2016

(86) PCT No.: PCT/JP2016/063825
§ 371 (c)(1),
(2) Date: Jun. 27, 2018

(87) PCT Pub. No.: WO2017/195263
PCT Pub. Date: Nov. 16, 2017

(65) Prior Publication Data
US 2019/0058365 A1 Feb. 21, 2019

(51) Int. Cl.
*H02K 1/27* (2006.01)
*H02K 29/03* (2006.01)

(52) U.S. Cl.
CPC .......... *H02K 1/2766* (2013.01); *H02K 29/03* (2013.01); *H02K 2213/03* (2013.01)

(58) Field of Classification Search
CPC ........ H02K 1/278; H02K 1/02; H02K 1/2766; H02K 21/14; H02K 29/03; H02K 2213/03
See application file for complete search history.

(56) References Cited

U.S. PATENT DOCUMENTS

| | | |
|---|---|---|
| 2007/0257576 A1 | 11/2007 | Adaniya et al. |
| 2008/0231135 A1 | 9/2008 | Suzuki et al. |
| 2009/0079287 A1 | 3/2009 | Hattori et al. |
| 2011/0266910 A1 | 11/2011 | Suzuki et al. |
| 2012/0032539 A1 | 2/2012 | Hori et al. |

(Continued)

FOREIGN PATENT DOCUMENTS

| | | |
|---|---|---|
| CN | 101167230 A | 4/2008 |
| CN | 103259356 A | 8/2013 |

(Continued)

OTHER PUBLICATIONS

Notice of Reasons for Refusal dated Nov. 5, 2019 from the Japanese Patent Office in application No. 2018-516239.

(Continued)

*Primary Examiner* — Jue Zhang
(74) *Attorney, Agent, or Firm* — Sughrue Mion, PLLC; Richard C. Turner

(57) ABSTRACT

A permanent-magnet motor includes a through-hole expansion portion provided in a through-hole for inserting a permanent magnet into the rotor core of a permanent-magnet motor, and a bridge portion that surrounds adjacent through-hole expansion portions and forms part of the outer circumferential surface of the rotor core; the bridge portion has a small-thickness portion that is formed to be smaller than that of a portion, other than the bridge portion, of the rotor core.

16 Claims, 4 Drawing Sheets

(56) References Cited

U.S. PATENT DOCUMENTS

| | | | |
|---|---|---|---|
| 2012/0139386 A1* | 6/2012 | Murakami | H02K 29/03 310/216.092 |
| 2012/0256508 A1 | 10/2012 | Suzuki et al. | |
| 2014/0091664 A1 | 4/2014 | Aoyama | |
| 2014/0145547 A1 | 5/2014 | Nakano et al. | |
| 2014/0368081 A1 | 12/2014 | Yabe et al. | |
| 2015/0084468 A1 | 3/2015 | Nigo et al. | |
| 2015/0130317 A1 | 5/2015 | Hung et al. | |
| 2015/0270753 A1 | 9/2015 | Ueda | |
| 2016/0336822 A1 | 11/2016 | Gasparin et al. | |

FOREIGN PATENT DOCUMENTS

| | | | |
|---|---|---|---|
| EP | 2418756 A1 | | 2/2012 |
| EP | 2463988 A2 | | 6/2012 |
| EP | 2922178 A2 | | 9/2015 |
| JP | 5778332 A | | 5/1982 |
| JP | 2005-080474 A | | 3/2005 |
| JP | 2006050821 A | * | 2/2006 |
| JP | 2006050821 A | | 2/2006 |
| JP | 2006238667 A | | 9/2006 |
| JP | 2008-099418 A | | 4/2008 |
| JP | 2008-236890 A | | 10/2008 |
| JP | 4541341 B2 | * | 9/2010 |
| JP | 4793249 B2 | | 10/2011 |
| JP | 2014-090550 A | | 5/2014 |
| JP | 2014155357 A | | 8/2014 |
| WO | 2011062064 A1 | | 5/2011 |
| WO | 2013/054439 A1 | | 4/2013 |
| WO | 2013/098921 A1 | | 7/2013 |
| WO | 2013114542 A1 | | 8/2013 |
| WO | 2014183410 A1 | | 11/2014 |
| WO | 2015/106946 A2 | | 7/2015 |

OTHER PUBLICATIONS

International Search Report for PCT/JP2016/063825, dated Jul. 5, 2016 (PCT/ISA/210).

Communication dated Apr. 24, 2019, from the European Patent Office in counterpart European Application No. 16901612.8.

Communication dated May 21, 2019, from the Japanese Patent Office in counterpart Application No. 2018-516239.

The First Office Action dated Dec. 4, 2019, issued by the China National Intellectual Property Administration in Application No. 201680085374.5.

* cited by examiner

PERMANENT-MAGNET MOTOR

CROSS REFERENCE TO RELATED APPLICATIONS

This application is a National Stage of International Application No. PCT/JP2016/063825 filed May 10, 2016.

TECHNICAL FIELD

The present invention relates to a permanent-magnet motor provided with permanent magnets for forming magnetic-field poles and particularly to a permanent-magnet motor in which permanent magnets for forming magnetic-field poles are embedded in the rotor.

BACKGROUND ART

As is well known, among permanent-magnet motors, a permanent-magnet motor in which permanent magnets for forming magnetic-field poles are embedded in the rotor is referred to as an IPM (Interior Permanent Magnet) motor. In a conventional IPM motor disclosed in Patent Document 1, the diameter of the portion of the rotor, in which a permanent magnet exists, is larger than that of the portion of the rotor, in which no permanent magnet exists; when the rotor rotates, the distance between the front endfaces of teeth of the stator and the outer circumferential surface of the rotor changes, so that a torque ripple is reduced.

As is well known, among permanent-magnet motors, a permanent-magnet motor in which permanent magnets for forming magnetic-field poles are arranged in such a way as to be exposed on the outer circumferential surface of the rotor is referred to as a SPM (Surface Permanent Magnet) motor. A conventional SPM motor disclosed in Patent Document 2 is provided with two groups of stator windings, which are formed in substantially the same manner; phase difference control is applied to the two groups of stator windings so that not only a torque ripple but also cogging torque is reduced.

PRIOR ART REFERENCE

Patent Document

[Patent Document 1] Japanese Patent Publication No. 4793249

[Patent Document 2] National Publication of International Patent Application No. WO 2013/054439

DISCLOSURE OF THE INVENTION

Problems to be Solved by the Invention

The conventional permanent-magnet motor disclosed in each of Patent Documents 1 and 2 can be utilized in various applications; in an environment where the conventional permanent-magnet motor is utilized, for example, in the environment where the conventional permanent-magnet motor is utilized in an electric power steering apparatus for assisting the steering of a vehicle driver, an operational sound and vibration at a time when the permanent-magnet motor is driven are transferred to the driver and, in some cases, causes the driver to have a feeling of discomfort. Accordingly, there has been a problem that although as described above, the torque ripple and cogging torque of the conventional permanent-magnet motor are reduced, it is required to further reduce the operational sound and vibration, depending on the application.

The present invention has been implemented in order to solve the foregoing problem in a conventional permanent-magnet motor; the objective thereof is to provide a permanent-magnet motor that can further reduce the operational sound and vibration at a time when it is driven.

Means for Solving the Problems

A permanent-magnet motor according to the present invention includes a stator core in which a plurality of electromagnetic steel sheets are stacked in an axle direction and in which teeth and slots are alternately formed in a circumferential direction, an armature coil that includes a conductor inserted into the slot and mounted in the stator core, a rotor core in which a plurality of electromagnetic steel sheets are stacked in the axle direction and that is disposed in such a way that the outer circumferential surface thereof faces the inner circumferential surface of the stator via a predetermined gap, and a plurality of permanent magnets that are embedded in the rotor core and form a plurality of magnetic-field poles in the rotor core; the permanent-magnet motor is characterized in that the armature coil is configured with at least two groups of coils that are formed in substantially the same manner, in that the rotor core includes a plurality of through-holes arranged in such a way as to be spaced via a gap apart from one another around the center axis of the rotor core, a plurality of through-hole expansion portions, each of which is provided in couple with corresponding each of the plurality of through-holes, and a bridge portion that is situated at the boundary portion between the magnetic-field poles, surrounds the adjacent through-hole expansion portions, and forms part of the outer circumferential surface of the rotor core, in that each of the plurality of permanent magnets is embedded in the rotor core in such a way as to be inserted into corresponding each of the plurality of through-holes, and in that the bridge portion has a small-thickness portion that is formed to be smaller than that of a portion, other than the bridge portion, of the rotor core.

Advantage of the Invention

In the permanent-magnet motor according to the present invention, the armature coil is configured with at least two groups of coils that are formed in substantially the same manner; the rotor core includes a plurality of through-holes arranged in such a way as to be spaced via a gap apart from one another around the center axis of the rotor core, respective through-hole expansion portions provided in the plurality of through-holes, and a bridge portion that is situated at the boundary portion between the magnetic-field poles, surrounds the adjacent through-hole expansion portions, and forms part of the outer circumferential surface of the rotor core; each of the plurality of permanent magnets is embedded in the rotor core in such a way as to be inserted into corresponding each of the plurality of through-holes; the bridge portion has a small-thickness portion that is formed to be smaller than that of a portion, other than the bridge portion, of the rotor core. As a result, it is made possible to suppress sound and vibration that are generated at a time when the permanent-magnet motor is driven.

BEST MODE FOR CARRYING OUT THE INVENTION

Embodiment 1

Figure 1:
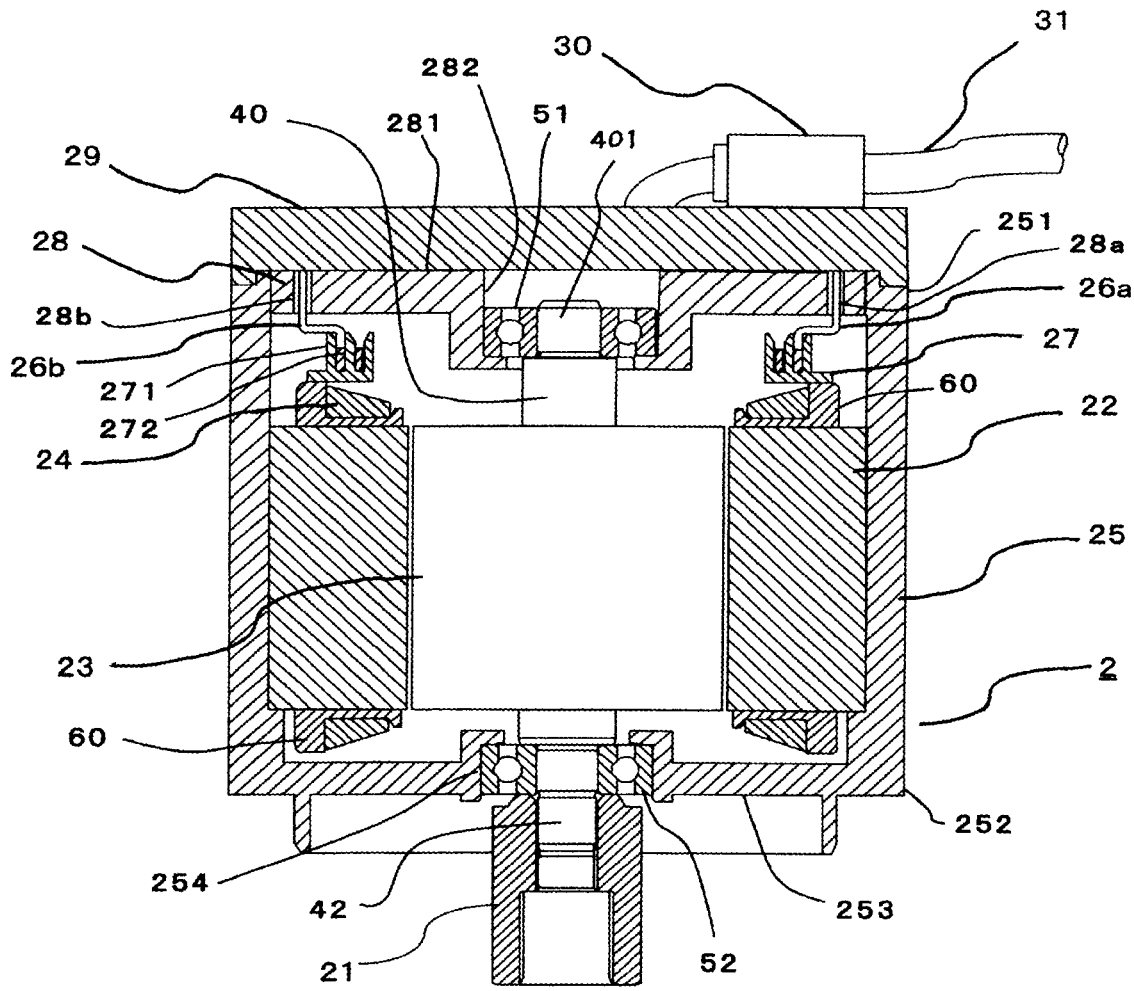
FIG. 1 is an axle-direction cross-sectional view of a permanent-magnet motor according to Embodiment 1 of the present invention.

Hereinafter, a permanent-magnet motor according to Embodiment 1 of the present invention will be explained in detail with reference to the drawings. FIG. 1 is an axle-direction cross-sectional view of the permanent-magnet motor according to Embodiment 1 of the present invention. The permanent-magnet motor illustrated in FIG. 1 is utilized, for example, in an electric power steering apparatus for a vehicle.

The permanent-magnet motor (simply referred to as a motor, hereinafter) 2 illustrated in FIG. 1 is an IPM motor; when roughly categorized, the motor 2 is provided with a motor case 25 formed in the shape of a cylindrical tube, a stator 22 fixed on the inner circumferential surface of the motor case 25, a rotor 23 disposed in such a way that the outer circumferential surface thereof faces the inner circumferential surface of the stator 22 through a predetermined gap, a rotor axle 40 on which the rotor 23 is fixed, a frame 28 that is fixed to the motor case 25 in such a way that the outer circumferential surface thereof abuts on the inner circumferential surface of one axle-direction end portion 251 of the motor case 25, and a bracket 29 that is fixed to the one axle-direction end portion 251 of the motor case 25 in such a way as to abut on one axle-direction endface 281 of the frame 28.

The frame 28 is disposed in such a way as to seal the one axle-direction end portion 251 of the motor case 25, which is opened, and is fixed to the motor case 25 in such a way that the outer circumferential surface thereof abuts on the inner circumferential surface of the motor case 25. A first bearing 51 is held by the frame 28 in such a way as to be inserted into a through-hole 282 provided in the radial-direction central portion of the frame 28. A wall portion 253 that seals the other end portion 252 of the motor case 25 is formed integrally with the motor case 25. A second bearing 52 is held by the wall portion 253 in such a way as to be inserted into a through-hole 254 provided in the radial-direction central portion of the wall portion 253 of the motor case 25.

One axle-direction end portion 40 of the rotor axle 40 is pivotably supported by the first bearing 51, and the other axle-direction end portion 42 of the rotor axle 40 is pivotably supported by the second bearing 52. An output axle 21 is fixed to the other axle-direction end portion 42 of the rotor axle 40 and is coupled with, for example, a speed reducing mechanism (unillustrated).

The stator 22 has a stator core 22a formed of a multiplicity of electromagnetic steel sheets stacked in the axis direction and an armature coil 24 mounted on the stator core 22a in an after-mentioned manner. The armature coil 24 is configured with two groups of 3-phase armature coils, which are formed in substantially the same manner. The rotor 23 has a rotor core 23a formed of a multiplicity of electromagnetic steel sheets stacked in the axis direction and after-mentioned permanent magnets, for two or more pairs of poles, that are embedded in the rotor core 23a. The rotor 23 is fixed on the rotor axle 40 in such a way that the radial-direction central portion thereof is penetrated by the rotor axle 40.

A connection ring 27 has a holder 271 formed of an insulator in a ring-shaped manner and two or more ring-shaped connecting conductors 272 that are fixed to the holder 271 in such a way as to be inserted into respective recessed grooves formed in the holder 271. The connection ring 27 is disposed in the immediate vicinity of the armature winding 24 and is fixed to a supporting body 60 fixed to the one axle-direction end portion of the stator 22.

The supporting bodies 60 formed of an insulator are fixed to the both respective axis-direction end portions of the stator 22, and each of the supporting bodies 60 supports the axle-direction end portion of the armature coil 24. Each of the two groups of 3-phase armature coils included in the armature coil 24 is 3-phase-Δ-connected or 3-phase-Y-connected by means of the connection ring 27.

One ends of first winding end portions 26a including three conductors are connected, through the intermediary of the connecting conductors 272 of the connection ring 27, with corresponding respective windings of one of the two groups of 3-phase armature coils; the other ends thereof are connected, through the intermediary of first through-holes 28a in the frame 28 and through-holes (unillustrated) in the bracket 29, with a connector 30.

One ends of second winding end portions 26b including three conductors are connected, through the intermediary of the connecting conductors 272 of the connection ring 27, with corresponding respective windings of the other one of the two groups of 3-phase armature coils; the other ends thereof are connected, through the intermediary of second through-holes 28b in the frame 28 and through-holes (unillustrated) in the bracket 29, with the connector 30. The connector 30 is fixed to the bracket 29 and connects the first winding end portions 26a and the second winding end portions 26b with an electric power converter (unillustrated) such as an inverter, through the intermediary of a cable 31.

Figure 2:
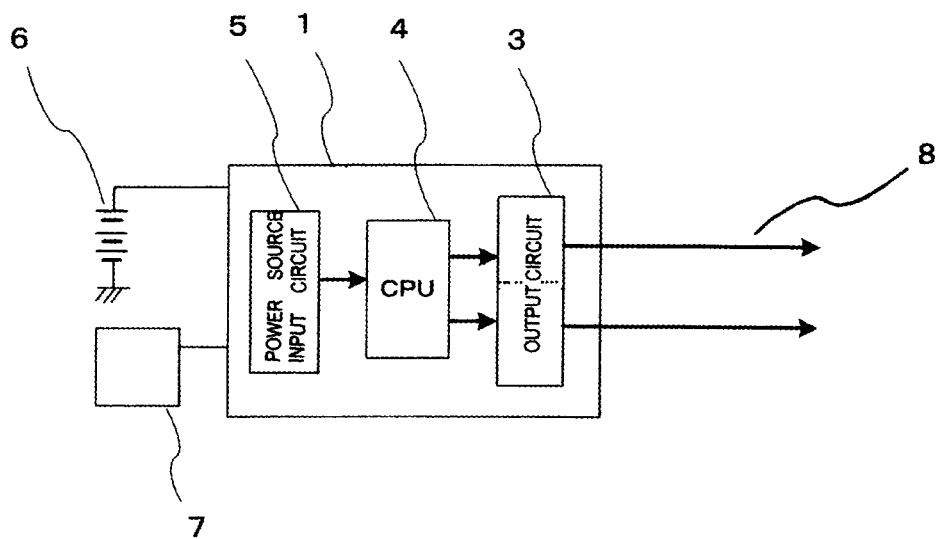
FIG. 2 is an explanatory diagram of a control unit in the permanent-magnet motor according to Embodiment 1 of the present invention.

Next, there will be explained a control unit that controls the permanent-magnet motor configured as described above. FIG. 2 is an explanatory diagram of a control unit in the permanent-magnet motor according to Embodiment 1 of the present invention. In FIG. 2, a control unit 1 is provided with a power source/input circuit 5, a CPU (central processing unit) 4 that calculates a control amount, and an output circuit 3.

The power source/input circuit 5 is connected with an external power source 6 such as a battery mounted in a vehicle or the like and includes a power source circuit that supplies electric power from the external power source 6 to the CPU 4 and the output circuit 3 and an input circuit to be connected with various kinds of sensors 7 provided in a vehicle or the like.

The CPU 4 calculates a control amount for controlling the output of the output circuit, based on various kinds of information pieces, for example, information pieces such as a vehicle speed and steering torque to be inputted thereto from the various kinds of sensors 7 by way of the power source/input circuit 5; then, the CPU 4 provides the control amount to the output circuit 3. The output circuit 3 is provided with an electric-power conversion circuit including a 3-phase bridge circuit configured with, for example, a plurality of switching devices; the output circuit 3 is supplied with electric power from the external power source 6 byway of the power source/input circuit 5 and generates a 3-phase output current controlled based on the control amount calculated by the CPU 4.

The output current outputted from the output circuit 3 of the control unit 1 is supplied to the cable 31 illustrated in FIG. 1, by way of a harness 8. The output current, outputted from the output circuit 3, that is supplied to the cable 31 is supplied to the one of 3-phase armature coils included in the armature coil 24, by way of the connector 30 and the first winding end portion 26a. Similarly, the output current, outputted from the output circuit 3, that is supplied to the cable 31 is supplied to the other one of 3-phase armature coils included in the armature coil 24, by way of the connector 30 and the second winding end portion 26b.

As described above, in the control unit 1, the various kinds of information pieces from the sensors 7 are transferred to the CPU 4 by way of the power source/input circuit 5; a control amount is calculated and outputted to the output circuit 3; then, the output circuit 3 supplies a 3-phase current to the armature coil 24 of the motor 2. In this situation, the respective coils in each of the one of and the other one of the 3-phase armature coils included in the armature coil 24 are supplied with phase currents whose phases are different from one another, by 120°; moreover, the one of and the other one of the 3-phase armature coils are supplied with 3-phase currents whose phases are different from each other, for example, by 30° (electric angle). Because the control unit 1 controls driving of the output circuit 3, based on a control amount calculated by the CPU 4, it is made possible to perform various kinds of motor controlling actions such as control of the rotation speed of the output axle 21 of the motor 2 and control of the output torque.

Figure 3:
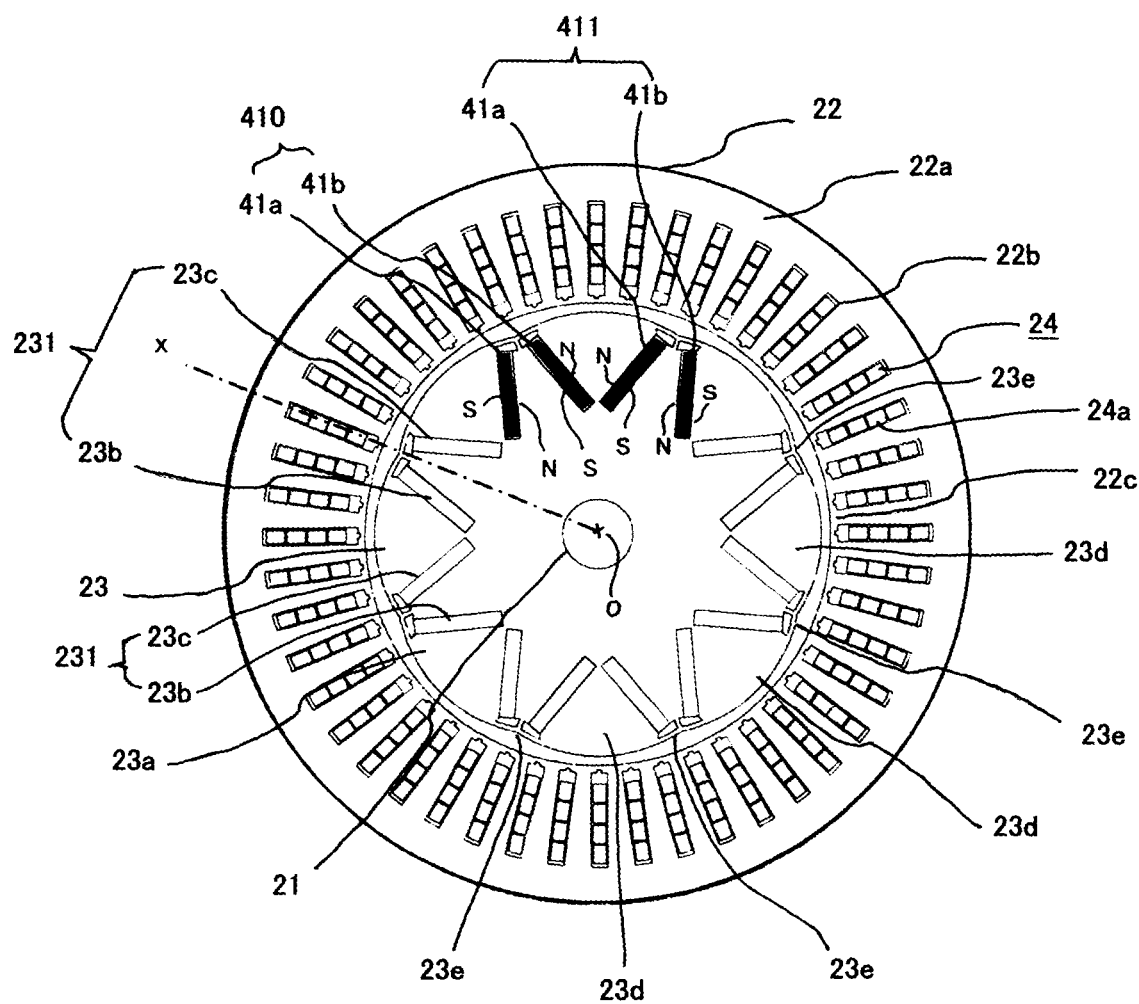
FIG. 3 is a cross-sectional view of the permanent-magnet motor according to Embodiment 1 of the present invention, taken along a plane perpendicular to the axle direction.
Figure 4A:
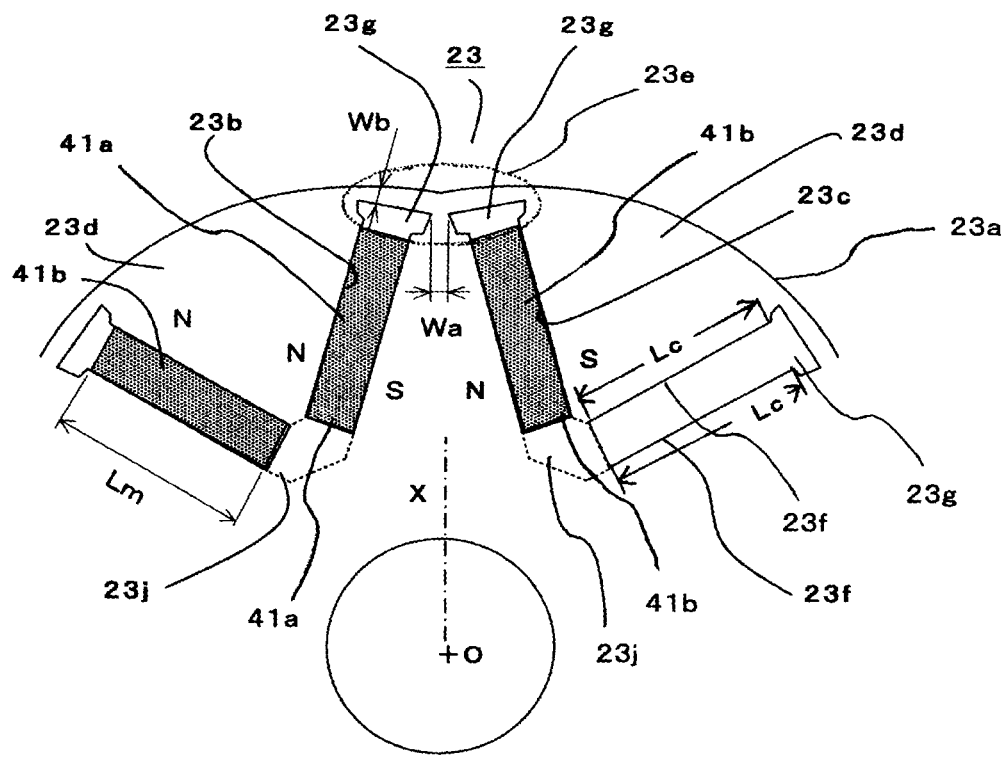
FIG. 4A is an explanatory view of a rotor in the permanent-magnet motor according to Embodiment 1 of the present invention.

Next, the configurations of the stator 22 and the rotor 23 of the motor 2 will be explained. FIG. 3 is a cross-sectional view of the permanent-magnet motor according to Embodiment 1 of the present invention, taken along a plane perpendicular to the axle direction; FIG. 4A is an explanatory view of the rotor in the permanent-magnet motor according to Embodiment 1 of the present invention; FIG. 4A is a partially enlarged view of the rotor 23 illustrated in FIG. 3. In FIGS. 3 and 4A, the stator core 22a of the stator 22 is provided with 48 pieces of slot 22b and 48 pieces of teeth 22c, each of which is situated between the adjacent slots 22b. Four pieces of coil conductors 24a included in the armature coil 24 are inserted into each of the slots 22b.

As described above, the stator core 22a is formed of a plurality of electromagnetic steel sheets that are stacked in the axle direction; at least part of the electromagnetic steel sheets, for example, half of the electromagnetic steel sheets are configured in such a way that the respective front-end portions of the adjacent teeth 22c are coupled with each other. As a result, especially, cogging torque can be reduced.

As described above, the rotor core 23a is configured with a plurality of electromagnetic steel sheets that are stacked in the axle direction; eight through-hole pairs 231 that each includes a first through-hole 23b and a second through-hole 23c, arranged symmetrically and each slanted at a predetermined angle with respect to a radial-direction straight line X intersecting the center axis O of the rotor core 23a, are arranged in steps of 45° around the center axis O. Each of the eight through-hole pairs 231 is disposed in a v-shaped manner in such a way that the distance between the portions of the through-holes, facing each other at the outer side in the radial direction of the rotor core 23a, is smaller than the distance between the portions thereof, facing each other at the inner side in the radial direction of the rotor core 23a. Each of the through-holes has a cross-sectional shape that is substantially a rectangle having a pair of long-side portions facing each other and a pair of short-side portions facing each other.

A first permanent magnet 41a and a second permanent magnet 41b whose cross sections are each formed substantially in the shape of a rectangle are inserted into the first through-hole 23b and the second through-hole 23c, respectively, in each of the eight pairs of through-holes 231. Explaining in more detail, the first permanent magnet 41a and the second permanent magnet 41b are inserted into the respective through-holes in such a way that one end surface portion forming one magnetic pole faces one of the long-side portions of the through-hole and that the other end surface portion forming the other magnetic pole faces the other one of the long-side portions of the through-hole.

The first permanent magnet 41a and the second permanent magnet 41b that are inserted into the respective through-holes of one of the two adjacent through-hole pairs 231 and 231 form a first permanent-magnet pair 410; the first permanent magnet 41a and the second permanent magnet 41b that are inserted into the respective through-holes of the other one of the two adjacent through-hole pairs 231 and 231 form a second permanent-magnet pair 411. FIG. 3 illustrates that the first permanent-magnet pair 410 and the second permanent-magnet pair 411 that each include the first permanent magnet 41a and the second permanent magnet 41b are inserted into only the two adjacent through-hole pairs 231; however, the first permanent-magnet pair 410 and the second permanent-magnet pair 411 that each include the first permanent magnet 41a and the second permanent magnet 41b are alternately inserted also into the other six through-hole pairs 231. Two or more permanent magnets form two or more permanent-magnet pairs in each of which the end surface portions having a different polarity substantially face each other; each of the permanent-magnet pairs is disposed in a v-shaped manner in such a way that the distance between the portions of the permanent magnets, facing each other at the outer side in the radial direction of the rotor core 23a, is smaller than the distance between the portions thereof, facing each other at the inner side in the radial direction of the rotor core 23a.

The first permanent magnet 41a in the first permanent-magnet pair 410 illustrated in FIG. 3 is magnetized in such a way that the end surface portion at the left side of the drawing becomes the S pole and the end surface portion at the right side thereof becomes the N pole; the second permanent magnet 41b is magnetized in such a way that the end surface portion at the left side of the drawing becomes the S pole and the end surface portion at the right side thereof becomes the N pole. In contrast, the first permanent magnet 41*a* in the second permanent-magnet pair 411 is magnetized in such a way that the end surface portion at the left side of the drawing becomes the N pole and the end surface portion at the right side thereof becomes the S pole; the second permanent magnet 41*b* is magnetized in such a way that the end surface portion at the left side of the drawing becomes the N pole and the end surface portion at the right side thereof becomes the S pole. The first permanent-magnet pairs 410 and the respective corresponding second permanent-magnet pairs 411 are alternately arranged around the center axis of the rotor 23.

As illustrated in FIG. 3, in the first permanent-magnet pair 410, the N-pole end surface portion of the first permanent magnet 41*a* faces the S-pole end surface portion of the second permanent magnet 41*b*. In the second permanent-magnet pair 411, the S-pole end surface portion of the first permanent magnet 41*a* faces the N-pole end surface portion of the second permanent magnet 41*b*. As described above, in each of the first permanent-magnet pair 410 and the second permanent-magnet pair 411, the first permanent magnet 41*a* and the second permanent magnet 41*b* face each other at the respective heteropolar end surface portions thereof. The same configuration applies to the relationships between the other first permanent-magnet pairs and the other corresponding second permanent-magnet pairs that are not illustrated in the drawings.

The N-pole end surface portion of the second permanent magnet 41*b* in the first permanent-magnet pair 410 faces the N-pole end surface portion of the first permanent magnet 41*a* in the second permanent-magnet pair 411. The S-pole end surface portion of the first permanent magnet 41*a* in the first permanent-magnet pair 410 faces the S-pole end surface portion of the second permanent magnet in the unillustrated second permanent-magnet pair that is situated at the immediately left side of the first permanent-magnet pair 410. The S-pole end surface portion of the second permanent magnet 41*b* in the second permanent-magnet pair 411 faces the S-pole end surface portion of the first permanent magnet in the unillustrated first permanent-magnet pair that is situated at the immediately right side of the second permanent-magnet pair 411. The same configuration applies to the relationships between the other first permanent-magnet pairs and the other corresponding second permanent-magnet pairs that are not illustrated in the drawings.

The rotor core 23*a* has a bridge portion 23*e* that surrounds the portion where the first permanent magnet 41*a* and the second permanent magnet 41*b* in the first permanent-magnet pair 410 face each other via a narrow gap in the vicinity of the outer circumferential surface of the rotor core 23*a* and has a bridge portion 23*e* that surrounds the portion where the first permanent magnet 41*a* and the second permanent magnet 41*b* in the second permanent-magnet pair 411 face each other via a narrow gap in the vicinity of the outer circumferential surface of the rotor core 23*a*. The rotor core 23*a* has a magnetic-field pole 23*d* where the first permanent-magnet pair 410 and the second permanent-magnet pair 411 face each other via a wide gap in the vicinity of the outer circumferential surface of the rotor core 23*a*. The bridge portion 23*e* is situated at the boundary portion between the adjacent magnetic-field poles 23*d*.

The rotor core 23*a* is not a perfect circle; the respective radiuses, at the bridge portions 23*e*, of the rotor core 23*a* are formed to be smaller than the respective radiuses, at the portions other than the bridge portions 23*e*, of the rotor core 23*a*. In the portion, at the magnetic-field pole 23*d*, of the rotor core 23*a*, the radius is maximum at the central portion and becomes smaller as the position approaches the bridge portion 23*e*. The magnetic-field pole 23*d* is inserted between the respective end surface portions of the permanent magnets having the same polarity and forms a magnetic-field pole of the N pole or the S pole.

In other words, the magnetic-field pole 23*d* inserted between the N-pole end surface portion of the second permanent magnet 41*b* in the first permanent-magnet pair 410 and the N-pole end surface portion of the first permanent magnet 41*a* in the second permanent-magnet pair 411 forms the N pole; the magnetic-field pole 23*d* inserted between the S-pole end surface portion of the first permanent magnet 41*a* in the first permanent-magnet pair 410 and the S-pole end surface portion of the second permanent magnet in the second permanent-magnet pair that is situated at the immediate left side of the first permanent-magnet pair 410 forms the S pole. The magnetic-field pole 23*d* inserted between the S-pole end surface portion of the second permanent magnet 41*b* in the second permanent-magnet pair 411 and the S-pole end surface portion of the first permanent magnet in the first permanent-magnet pair that is situated at the immediate right side of the second permanent-magnet pair 411 forms the S pole. Thus, the N-pole magnetic-field poles 23*d* and the respective corresponding S-pole magnetic-field poles 23*d* are alternately arranged in the circumferential surface portion of the rotor 23.

Each of the first through-hole 23*b* and the second through-hole 23*c* has a cross-sectional shape that is substantially a rectangle having a pair of long-side portions facing each other and a pair of short-side portions facing each other; the first permanent magnet 41*a* and the second permanent magnet 41*b* are inserted into the respective through-holes in such a way that one end surface portion forming one magnetic pole faces one of the long-side portions of the first through-hole 23*b* or the second through-hole 23*c* and that the other end surface portion forming the other magnetic pole faces the other one of the long-side portions of the through-hole.

Respective through-hole expansion portions 23*g* are provided in such a way as to be coupled with the first through-hole 23*b* and the second through-hole 23*c*. The through-hole expansion portions 23*g* form an enlarged space that is in contact with the end surface portions, at the circumferential surface portion side of the rotor core 23*a*, of the first permanent magnet 41*a* and the second permanent magnet 41*b* corresponding to the through-hole expansion portion 23*g*. The respective through-hole expansion portions 23*g* of the first through-hole 23*b* and the second through-hole 23*c* and the bridge portion 23*e* of the rotor core 23*a* have respective important roles related to the flow of magnetic flux, as described later.

As described above, the armature coil 24 mounted on the stator core 22*a* is energized by an electric current from the control unit 1 so as to generate magnetic flux that flows in the teeth 22*c*, so that respective rotating magnetic fields of the N pole and the S pole are produced in the stator 22. As a result, the rotor 23 is rotated by attractive force and repulsive force between the N and S poles formed in the respective magnetic-field poles 23*d* of the rotor 23 and the N and S poles produced in the stator 22.

In this situation, the flow of magnetic flux generated by the first permanent magnet 41*a* and the second permanent magnet 41*b* will be described. Magnetic flux generated by the N pole of the second permanent magnet 41*b* in the first permanent-magnet pair 410 and the N-pole of the first permanent magnet 41*a* in the second permanent-magnet pair 411 flows in the magnetic path that starts from the magnetic-field pole 23d, of the rotor core 23a, that is flanked with the first permanent-magnet pair 410 and the second permanent-magnet pair 411, reaches the immediately left magnetic-field pole 23d via the gap between the rotor 23 and the stator 22, and then reaches the S pole of the first permanent magnet 41a in the first permanent-magnet pair 410; concurrently, the foregoing magnetic flux flows in the magnetic path that starts from the magnetic-field pole 23d that is flanked with the first permanent-magnet pair 410 and the second permanent-magnet pair 411, reaches the immediately right magnetic-field pole 23d via the gap between the rotor 23 and the stator 22, and then reaches the S pole of the second permanent magnet 41b in the second permanent-magnet pair 411.

Furthermore, with regard to the first permanent-magnet pair 410, magnetic flux produced by the N pole of the first permanent magnet 41a flows in the magnetic path that reaches the S pole of the adjacent second permanent magnet 41b via the rotor core 23a; concurrently, magnetic flux produced by the N pole of the second permanent magnet 41b flows in the magnetic path that reaches the S pole of the first permanent magnet 41a via the magnetic-field pole 23d and the bridge portion 23e of the rotor core 23a. With regard to the second permanent-magnet pair 411, magnetic flux produced by the N pole of the first permanent magnet 41a flows in the magnetic path that reaches the S pole of the second permanent magnet 41b via the magnetic-field pole 23d and the bridge portion 23e of the rotor core 23a; concurrently, magnetic flux produced by the N pole of the second permanent magnet 41b flows in the magnetic path that reaches the S pole of the adjacent first permanent magnet 41a via the rotor core 23a.

In other words, the magnetic paths in which the magnetic flux lines generated by the N pole of the first permanent magnet 41a and the N pole of the second permanent magnet 41b flow include a first magnetic path that starts from the magnetic-field pole 23d of the rotor core 23a and reaches the S pole of the first permanent magnet 41a and the S pole of the second permanent magnet 41b via the foregoing gap and the adjacent left and right magnetic-field poles 23d and a second magnetic path that reaches the S poles of the adjacent first permanent magnet 41a and the S pole of the adjacent second permanent magnet 41b via the bridge portion 23e of the rotor core 23a without passing the foregoing gap.

Accordingly, the amount of magnetic flux that flows in the first magnetic path including the gap between the rotor 23 and the stator 22 is reduced by the amount of magnetic flux that flows in the second magnetic path that does not include the gap but includes only the bridge portion 23e of the rotor core 23a. As a result, because the amount of magnetic flux to be emitted from the magnetic-field pole 23d of the rotor 23 to the gap decreases, the rotation speed and the torque of the rotor 23 decreases.

Thus, in order to suppress the magnetic flux that does not pass through the gap and flows directly from the N pole of each of the first permanent magnet 41a and the second permanent magnet 41b to the S pole of corresponding each of the first permanent magnet 41a and the second permanent magnet 41b, the permanent-magnet motor according to Embodiment 1 of the present invention has a small-thickness portion, the cross-sectional area of which is formed to be smaller than that of the magnetic-field pole 23d of the rotor core 23a, in the bridge portion 23e of the rotor core 23a.

Because the small-thickness portion is formed in the bridge portion 23e of the rotor core 23a, the magnetic resistance of the foregoing second magnetic path that passes through the bridge portion 23e increases and hence the amount of magnetic flux that flows in the second magnetic path decreases; as a result, the amount of magnetic flux to be emitted to the gap between the rotor 23 and the stator 22, i.e., the amount of magnetic flux that flows in the foregoing first magnetic path, increases.

Next, the method of forming the small-thickness portion in the bridge portion 23e will be explained. When Wb, tb, tr, and Wa denote the radial-direction minimum width, at the bridge portion 23e, of the rotor core 23a, the board thickness, at the bridge portion 23e, of the electromagnetic steel sheet, the board thickness, at the portions other than the bridge portion 23e, of the electromagnetic steel sheet, and the minimum distance with which the adjacent through-hole expansion portions 23g face each other, respectively, the small-thickness portion is formed by forming the rotor in such a way that at least one of the equations (1), (2), and (3) below is satisfied.

$$Wb \leq tb(=tr) \tag{1}$$

$$Tb \leq tr \tag{2}$$

$$Wa \leq tb \tag{3}$$

In the case where when the respective electromagnetic steel sheets at the bridge portion 23e and the other portion have one and the same board thickness, the small-thickness portion is formed according to the foregoing equation (1), the magnetic resistance of the foregoing second magnetic path increases and hence magnetic flux that flows in the second magnetic path can be suppressed.

In the case where when the respective electromagnetic steel sheets, included in the rotor core 23a, at the bridge portion 23e and the other portion have different board thicknesses, the small-thickness portion is formed according to the foregoing equation (2), the magnetic resistance of the foregoing second magnetic path increases and hence magnetic flux that flows in the second magnetic path can be suppressed.

Furthermore, in the case where the small-thickness portion is formed according to the foregoing equation (3), it is prevented that magnetic flux starts from the N pole of the first permanent magnet 41a and directly reaches the S pole of the first permanent magnet 41a via the bridge portion 23e, and it can be prevented that magnetic flux starts from the N pole of the second permanent magnet 41b and directly reaches the S pole of the second permanent magnet 41b via the bridge portion 23e.

Next, the first through-hole 23b and the second through-hole 23c will be explained. When it is assumed that the length of a pair of opposing surface portions in each of the first through-hole 23b and the second through-hole 23c is Lc and the length of the end surface portion of each of the first permanent magnet 41a and the second permanent magnet 41b is Lm, Embodiment 1 illustrated in FIG. 4A is configured in such a way as to satisfy the equation below.

$$Lc \geq Lm$$

The reason why Embodiment 1 is configured in such a manner as described above is to prevent the magnetic flux that flows through the space between the rotor core 23a and the end surface portion of each of the first permanent magnet 41a and the second permanent magnet 41b from being suppressed by the space portion of the through-hole expansion portion 23g.

It may be allowed that as indicated by a broken line in FIG. 4A, an inner-diameter-side through-hole 23j is formed in the portion of the rotor core 23a at a position where the first permanent magnet 41a and the second permanent magnet 41b closely faces each other in the radial-direction inner side of the rotor 23. FIG. 4A illustrates the case where because the stator 22 does not exist in the vicinity thereof, only one inner-diameter-side through-hole 23j is commonly provided across the first permanent magnet 41a and the second permanent magnet 41b. It may be allowed that the respective inner-diameter-side through-holes 23j are provided in such a way as to individually correspond to the first permanent magnet 41a and the second permanent magnet 41b. The inner-diameter-side through-hole 23j may be either coupled or uncoupled with the first through-hole 23b and the second through-hole 23c. As is the case with the foregoing through-hole expansion portion 23g, the inner-diameter-side through-hole 23j can suppress magnetic flux from directly flowing through the space between the adjacent first permanent magnet 41a and second permanent magnet 41b.

Figure 4B:
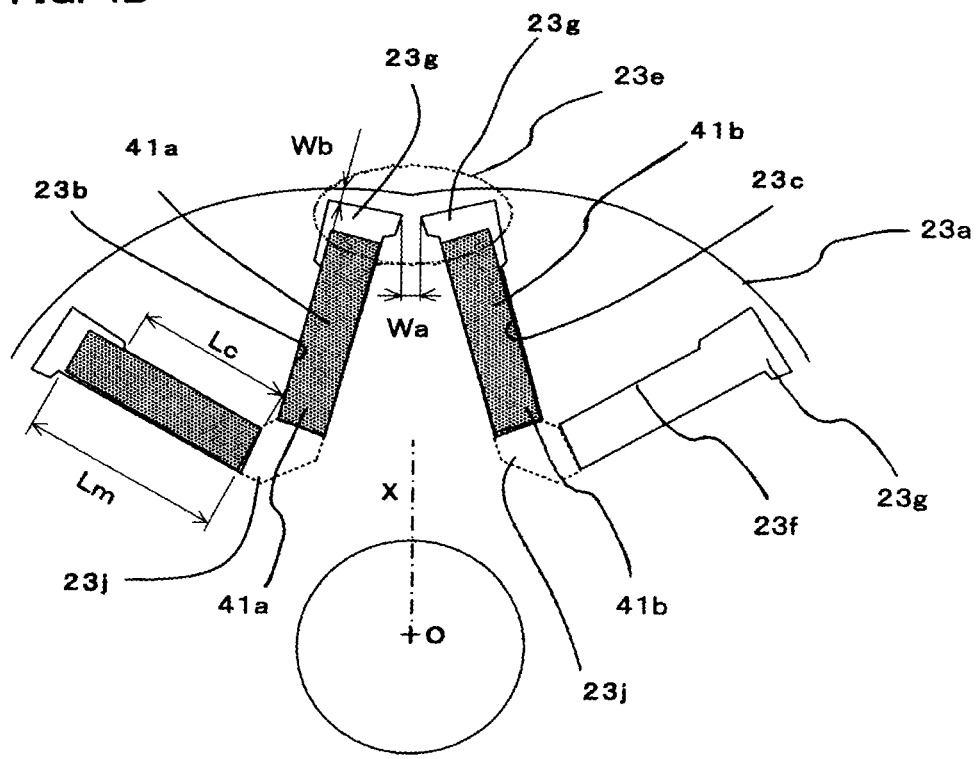
FIG. 4B is an explanatory view of a rotor in a permanent-magnet motor as an variant example of Embodiment 1 of the present invention.

Next, a variant example of the permanent-magnet motor according to Embodiment 1 of the present invention will be explained. FIG. 4B is an explanatory view of a rotor in a permanent-magnet motor as a variant example of Embodiment 1 of the present invention. In the variant example of Embodiment 1, illustrated in FIG. 4B, the respective shapes of the first through-hole 23b into which the first permanent magnet 41a is inserted and the second through-hole 23c into which the second permanent magnet 41b is inserted are different from each other. That is to say, with regard to the first through-hole 23b, the length Lc of the opposing surface portion 23f at the left side of the drawing is formed to be smaller than the length Lc of the opposing surface portion 23f at the right side of the drawing; in contrast, with regard to the second through-hole 23c, the length Lc of the opposing surface portion 23f at the right side of the drawing is formed to be smaller than the length Lc of the opposing surface portion 23f at the left side of the drawing. In other words, the through-hole expansion portion 23g coupled with the first through-hole 23b is expanded halfway up to the end surface portion, at the left side of the drawing, of the first permanent magnet 41a; the through-hole expansion portion 23g coupled with the second through-hole 23c is expanded halfway up to the end surface portion, at the right side of the drawing, of the second permanent magnet 41b.

Accordingly, the length Lc of the opposing surface portion, at the right side of the drawing, of the first through-hole 23b is substantially the same as the length Lm of the end surface portion, at the right side of the drawing, of the first permanent magnet 41a; however, the length Lc of the end surface portion at the left side of the drawing is formed in such a way that in the relationship with the length Lm of the end surface portion, at the left side of the drawing, of the first permanent magnet 41a, the equation below is satisfied.

$Lc \leq Lm$

In contrast, the length Lc of the opposing surface portion 23f, at the left side of the drawing, of the second through-hole 23c is substantially the same as the length Lm of the end surface portion, at the left side of the drawing, of the first permanent magnet 41a; however, the length Lc of the opposing surface portion 23f at the right side of the drawing is formed in such a way that in the relationship with the length Lm of the end surface portion, at the right side of the drawing, of the first permanent magnet 41a, the equation below is satisfied.

$Lc \leq Lm$

Accordingly, the amount of magnetic flux that flows from the respective N-pole end surface portions of the first permanent magnet 41a and the second permanent magnet 41b to the magnetic-field pole 23d of the rotor core 23a is suppressed, and the amount of magnetic flux that flows from the magnetic-field pole 23d of the rotor core 23a to the respective S-pole end surface portions of the first permanent magnet 41a and the second permanent magnet 41b is suppressed.

It may be allowed that as indicated by a broken line in FIG. 4B, the inner-diameter-side through-hole 23j is formed in the portion of the rotor core 23a at a position where the first permanent magnet 41a and the second permanent magnet 41b closely faces each other in the radial-direction inner side of the rotor 23. FIG. 4B illustrates the case where because the stator 22 does not exist in the vicinity thereof, only one inner-diameter-side through-hole 23j is commonly provided across the first permanent magnet 41a and the second permanent magnet 41b. It may be allowed that the respective inner-diameter-side through-holes 23j are provided in such a way as to individually correspond to the first permanent magnet 41a and the second permanent magnet 41b. The inner-diameter-side through-hole 23j may be either coupled or uncoupled with the first through-hole 23b and the second through-hole 23c. As is the case with the foregoing through-hole expansion portion 23g, the inner-diameter-side through-hole 23j can suppress magnetic flux from directly flowing through the space between the adjacent first permanent magnet 41a and second permanent magnet 41b.

A conventional permanent-magnet motor is configured in such a way that the respective phases of cogging torques and torque ripples produced by the permanent magnets are cancelled over the whole rotor; however, there has been a problem that when one permanent magnet is misaligned from the ideal position, the torque ripple becomes large.

In general, in the case where when it is assumed that S denotes the number of slots provided in the stator and P denotes the number of permanent-magnet pairs provided in the rotor, i.e., the number of magnetic-field poles, the equation below is satisfied, the respective phases of cogging torques and torque ripples produced by the permanent magnets can be made to synchronize with one another.

$S=6nP$ where n is an arbitrary integer.

As a result, even when a permanent magnet is misaligned from the ideal position, it is made possible to suppress the cogging torque and the torque ripple from being enlarged and hence the requirement for the positional accuracy of the permanent magnet can be relaxed.

As described above, in the case of the permanent-magnet motor according to Embodiment 1 of the present invention, the rotor 23 is provided with 8-pole magnetic-field poles including 16 permanent magnets, and the stator 22 is provided with 48 slots. Accordingly, because the foregoing equation [S=6nP (n=1)] is satisfied, the respective phases of cogging torques and torque ripples produced by the permanent magnets can be made to synchronize with one another.

As a result, even when a permanent magnet is misaligned from the ideal position, it is made possible to suppress the cogging torque and the torque ripple from being enlarged and hence the requirement for the positional accuracy of the permanent magnet can be relaxed.

As described above, because of the outer circumference shape of the rotor and because of providing a small-thickness portion in the bridge portion, which is the vicinity of a through-hole in which a permanent magnet is embedded, it is made possible to provide a motor that can reduce the torque ripple. Moreover, because of phase difference control by means of two groups of 3-phase windings and because of coupling at least part of the respective front-end portions of the teeth, it is made possible to further reduce the cogging torque, and eventually, it is made possible to suppress the vibration of the motor when being driven and generation of sound.

Embodiment 2

Figure 5:
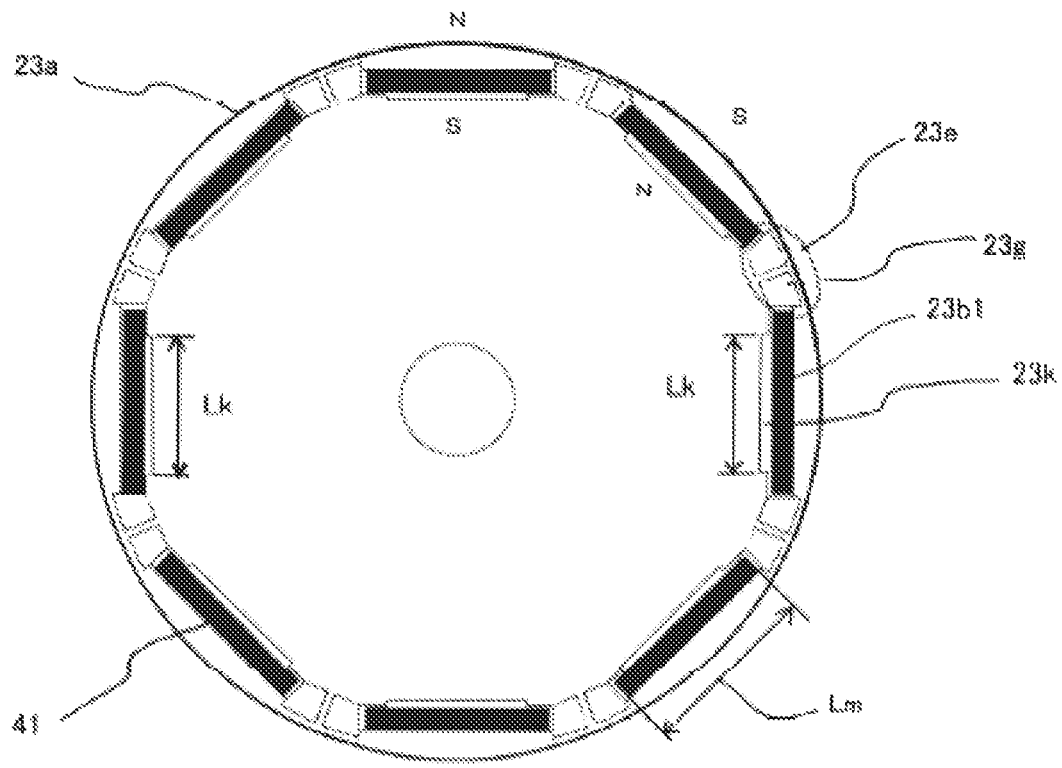
FIG. 5 is an explanatory view of a rotor in a permanent-magnet motor according to Embodiment 2 of the present invention.

Next, a permanent-magnet motor according to Embodiment 2 of the present invention will be explained. FIG. 5 is an explanatory view of a rotor in a permanent-magnet motor according to Embodiment 2 of the present invention; the constituent elements the same as or equivalent to those in foregoing Embodiment 1 are designated by reference characters the same as those in Embodiment 1. As illustrated in FIG. 5, in the permanent-magnet motor according to Embodiment 2, a plurality of permanent magnets 41 are arranged in such a way as to form a polygonal shape in the vicinity of the outer circumferential surface of the rotor core 23a; the end surface portions that form the magnetic poles of the permanent magnet 41 are arranged in a direction perpendicular to the radial direction of the rotor core 23a.

As illustrated in FIG. 5, each of the permanent magnets is magnetized in a polarity opposite to the polarity in which the adjacent permanent magnet 41 is magnetized. A bridge portion 23e is provided in the rotor core 23a between the adjacent permanent magnets 41. A through-hole expansion portion 23g is provided at each of both longitudinal-direction end portions of the through-hole 23b1 for embedding the permanent magnet 41 in the rotor core 23a, in such a way as to be close to corresponding each of both longitudinal-direction end portions of the permanent magnet 41.

As is the case with foregoing Embodiment 1, the bridge portion 23e has a small-thickness portion; because as is the case with Embodiment 1, the flow of magnetic flux that flows between the adjacent permanent magnets 41 via the bridge portion 23e is suppressed, it is made possible to increase the amount of magnetic flux that flows from the magnetic-field pole to the gap between the rotor and the stator.

When as a method of forming the small-thickness portion in the bridge portion 23e, the rotor is formed in such a way that as is the case with foregoing Embodiment 1, at least one of the foregoing equations (1), (2), and (3) is satisfied, the small-thickness portion is formed.

A through-hole-width expansion portion 23k, formed in such a way that the width thereof is larger than the width of the permanent magnet 41, is provided at the portion, at the radial-direction inside of the rotor, of the through-hole 23b1. When it is assumed that Lk denotes the length of the through-hole-width expansion portion 23k and Lm denotes the length of the end surface portion of the permanent magnet 41, the relationship below is satisfied.

$$Lk < Lm$$

As a result, in the permanent magnet 41 whose end surface portion at the radial-direction inner side of the rotor core 23a is magnetized as the N pole, the amount of magnetic flux that flows from the N-pole end surface portion to the rotor core 23a is suppressed; in the permanent magnet 41 whose end surface portion at the radial-direction inner side of the rotor core 23a is magnetized as the S pole, the amount of magnetic flux that flows from the rotor core 23a to the S-pole end surface portion is suppressed.

The other configurations of the permanent-magnet motor according to Embodiment 2 of the present invention are the same as those of the permanent-magnet motor according to foregoing Embodiment 1.

As is the case with the permanent-magnet motor according to foregoing Embodiment 1, the permanent-magnet motor according to Embodiment 2 of the present invention, in which as described above, permanent magnets are embedded in the shape of a polygon, demonstrates an effect that a torque ripple can be reduced.

Embodiment 3

Figure 6:
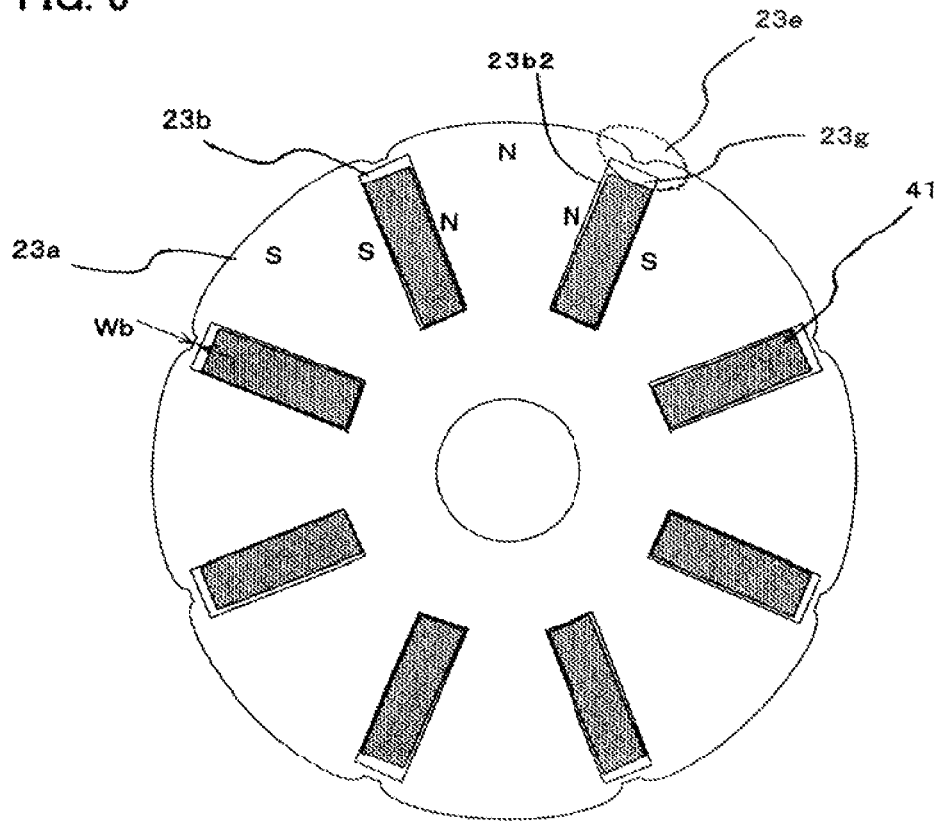
FIG. 6 is an explanatory view of a rotor in a permanent-magnet motor according to Embodiment 3 of the present invention.

Next, a permanent-magnet motor according to Embodiment 3 of the present invention will be explained. FIG. 6 is an explanatory view of a rotor in a permanent-magnet motor according to Embodiment 3 of the present invention; the constituent elements the same as or equivalent to those in foregoing Embodiments 1 and 2 are designated by reference characters the same as those in Embodiments 1 and 2. As illustrated in FIG. 6, in the permanent-magnet motor according to Embodiment 3, eight permanent magnets 41 are radially arranged in such a way as to be spaced by a predetermined angle apart from one another in the radial direction of the rotor core 23a.

The foregoing eight permanent magnets 41 are arranged in such a way that the magnetizing directions thereof reverse in an alternating manner. The length, in the radial direction of the rotor core 23a, of the through-hole 23b2 for embedding corresponding each of the permanent magnets 41 in the rotor core 23a is set to be larger than the length, in the radial direction of the rotor core 23a, of the permanent magnet 41. Each of the permanent magnets 41 is inserted into the through-hole 23b2 in such a way as to abut on or adjacent to the inner end surface portion, in the radial direction of the rotor core 23a of the through-hole 23b2; the permanent magnet 41 does not exist at the outer end surface portion, in the radial direction of the rotor core 23a, of the through-hole 23b2. The end surface portion of the through-hole 23b2, at which the permanent magnet 41 does not exist, forms the through-hole expansion portion 23g.

As is the case with each of foregoing Embodiments 1 and 2, the bridge portion 23e has a small-thickness portion. When as a method of forming the small-thickness portion in the bridge portion 23e, the rotor is formed in such a way that as is the case with foregoing Embodiment 1, at least one of the foregoing equations (1), (2), and (3) is satisfied, the small-thickness portion is formed. Because the bridge portion 23e has the small-thickness portion, the flow of magnetic flux that flows between the N pole and the S pole of the permanent magnets 41 via the bridge portion 23e is suppressed; thus, it is made possible to increase the amount of magnetic flux that flows from the magnetic-field pole to the gap between the rotor and the stator.

When magnetized by the adjacent permanent magnets 41, the rotor core 23a situated between the adjacent permanent magnets 41 becomes the N-pole magnetic-field pole or the S-pole magnetic-field pole, and the bridge portion 23e exists at the boundary between the respective magnetic-field poles. The respective radiuses, at the bridge portions 23e, of the rotor core 23a are formed to be smaller than the respective radiuses, at the portions other than the bridge portions 23e, of the rotor core 23a; therefore, the distance between the rotor core 23a and the teeth of the stator core, at the boundary portion between the magnetic-field poles, becomes large, and hence the cogging torque can be reduced.

Moreover, in comparison with the structure of the permanent-magnet motor according to Embodiment 2, the both end surfaces of the permanent magnet 41 face the teeth of the stator, so that the torque to be generated becomes larger than that of Embodiment 2.

As described above, in the permanent-magnet motor according to Embodiment 3 of the present invention, the permanent magnets are radially embedded in the rotor core, and the radius, at the bridge portion existing at the boundary portion between the adjacent magnetic-field poles, of the rotor core 23a is formed to be smaller than the radius of the rotor core 23a that forms the magnetic-field pole; furthermore, as is the case with each of foregoing Embodiments 1 and 2, the bridge portion 23e has a small-thickness portion. Therefore, there is demonstrated an effect that both the torque ripple and the cogging torque can be reduced.

The present invention is not limited to the respective permanent-magnet motors according to foregoing Embodiments 1, 2, and 3; in the scope within the spirits of the present invention, the respective configurations of Embodiments 1, 2, and 3 can appropriately be combined with one another, can partially be modified, or can partially be omitted.

INDUSTRIAL APPLICABILITY

A permanent-magnet motor according to the present invention can be applied to the field of an electric power steering apparatus to be mounted in a vehicle such as an automobile or to the automobile industry.

DESCRIPTION OF REFERENCE NUMERALS

2: permanent-magnet motor
21: output axle
22: stator
22a: stator core
22b: slot
22c: teeth
23: rotor
23a: rotor core 23
23b: first through-hole
23c: second through-hole
23b1, 23b2: through-hole
23d: magnetic-field pole
23e: bridge portion
23f: opposing surface portion
23g: through-hole expansion portion 23
23j: inner-diameter-side through-hole
23k: through-hole-width expansion portion
231: through-hole pair
41: permanent magnet
41a: first permanent magnet
41b: second permanent magnet
410: first permanent-magnet pair
411: second permanent-magnet pair
24: armature coil
24a: coil conductor
25: motor case
28: frame
29: bracket
40: rotor axle
51: first bearing
52: second bearing

The invention claimed is:

1. A permanent-magnet motor comprising:
a stator core in which a plurality of electromagnetic steel sheets are stacked in an axle direction and in which teeth and slots are alternately formed in a circumferential direction;
an armature coil that includes a conductor inserted into the slot and is mounted in the stator core;
a rotor core in which a plurality of electromagnetic steel sheets are stacked in the axle direction and that is disposed in such a way that the outer circumferential surface thereof faces the inner circumferential surface of the stator core via a predetermined gap; and
a plurality of permanent magnets that are embedded in the rotor core and form a plurality of magnetic-field poles in the rotor core,
wherein the armature coil is configured with at least two groups of coils that are formed in substantially the same manner,
wherein the rotor core includes
a plurality of through-holes arranged in such a way as to be spaced via a gap apart from one another around the center axis of the rotor core,
a plurality of through-hole expansion portions, each of which is provided in couple with corresponding each of the plurality of through-holes, and
a bridge portion that is situated at the boundary portion between the magnetic-field poles, surrounds the adjacent through-hole expansion portions, and forms part of the outer circumferential surface of the rotor core,
wherein each of the plurality of permanent magnets is embedded in the rotor core in such a way as to be inserted into corresponding each of the plurality of through-holes, and
wherein the bridge portion has a small-thickness portion whose cross-sectional area is formed to be smaller than that of a portion, other than the bridge portion, of the rotor core,
wherein when Wb denotes the radial-direction minimum width, at the bridge portion, of the rotor core, tb denotes the board thickness, at the bridge portion, of the electromagnetic steel sheet, tr denotes the board thickness, at the portion other than the bridge portion, of the electromagnetic steel sheet, and Wa denotes the minimum distance with which the adjacent through-hole expansion portions face each other, the small-thickness portion of the bridge portion is formed in such a way that at least one of the equations (1), (2), and (3) below is satisfied $$Wb \leq tb(=tr) \qquad (1)$$

$$tb \leq tr \qquad (2)$$

$$Wa \leq tb \qquad (3).$$

2. The permanent-magnet motor according to claim 1, wherein the through-hole has a cross-sectional shape that is substantially a rectangle having a pair of long-side portions facing each other and a pair of short-side portions facing each other,
wherein the permanent magnet is inserted into the through-hole in such a way that one end surface portion forming one magnetic pole faces one of the long-side portions of the through-hole and that the other end surface portion forming the other magnetic pole faces the other one of the long-side portions of the through-hole, wherein when Lc denotes the length of the long-side portion of the through-hole and Lm denotes the length of the end surface portion of the permanent magnet, at least one of the pair of long-side portions of the through-hole satisfies the equation below $Lc \geq Lm$.

3. The permanent-magnet motor according to claim 1,
wherein the through-hole has a cross-sectional shape that is substantially a rectangle having a pair of long-side portions facing each other and a pair of short-side portions facing each other,
wherein the permanent magnet is inserted into the through-hole in such a way that one end surface portion forming one magnetic pole faces one of the long-side portions of the through-hole and that the other end surface portion forming the other magnetic pole faces the other one of the long-side portions of the through-hole, and
wherein when Lc denotes the length of the long-side portion of the through-hole and Lm denotes the length of the end surface portion of the permanent magnet, one of the pair of long-side portions of the through-hole satisfies the equation below $Lc < Lm$.

4. The permanent-magnet motor according to claim 1,
wherein the plurality of permanent magnets form a plurality of permanent-magnet pairs in each of which the end surface portions having a different polarity substantially face each other, and
wherein each of the permanent-magnet pairs is configured with a pair of the permanent magnets that are arranged in a v-shaped manner in such a way that the distance between the portions of the permanent magnets, facing each other at the outer side in the radial direction of the rotor core, is smaller than the distance between the portions thereof, facing each other at the inner side in the radial direction of the rotor core.

5. The permanent-magnet motor according to claim 1, wherein the plurality of permanent magnets are radially arranged around the center axis of the rotor core in such a way as to be spaced by a predetermined angle apart from one another.

6. The permanent-magnet motor according to claim 1,
wherein the plurality of permanent magnets are arranged in such a way as to form a polygonal shape in the vicinity of the outer circumferential surface of the rotor core, and
wherein the end surface portions that form the magnetic poles of the permanent magnet are arranged in a direction perpendicular to the radial direction of the rotor core.

7. The permanent-magnet motor according to claim 1, wherein the radius, at the bridge portions, of the rotor core is formed to be smaller than the radius, at the portion other than the bridge portion, of the rotor core.

8. The permanent-magnet motor according to claim 1, wherein at least part of the plurality of teeth are configured in such a way that the respective front-end portions thereof are coupled with each other.

9. The permanent-magnet motor according to claim 1, wherein when S denotes the number of the slots, and P denoted the number of the magnetic-field poles, the equation below is satisfied $S = 6nP$ (n: an arbitrary integer).

10. The permanent-magnet motor according to claim 9,
wherein the plurality of permanent magnets form a plurality of permanent-magnet pairs in each of which the end surface portions having a different polarity substantially face each other, and
wherein each of the permanent-magnet pairs is configured with a pair of the permanent magnets that are arranged in a v-shaped manner in such a way that the distance between the portions of the permanent magnets, facing each other at the outer side in the radial direction of the rotor core, is smaller than the distance between the portions thereof, facing each other at the inner side in the radial direction of the rotor core.

11. The permanent-magnet motor according to claim 9, wherein the plurality of permanent magnets are radially arranged around the center axis of the rotor core in such a way as to be spaced by a predetermined angle apart from one another.

12. The permanent-magnet motor according to claim 9,
wherein the plurality of permanent magnets are arranged in such a way as to form a polygonal shape in the vicinity of the outer circumferential surface of the rotor core, and
wherein the end surface portions that form the magnetic poles of the permanent magnet are arranged in a direction perpendicular to the radial direction of the rotor core.

13. The permanent-magnet motor according to claim 9, wherein the radius, at the bridge portions, of the rotor core is formed to be smaller than the radius, at the portion other than the bridge portion, of the rotor core.

14. The permanent-magnet motor according to claim 9, wherein at least part of the plurality of teeth are configured in such a way that the respective front-end portions thereof are coupled with each other.

15. The permanent-magnet motor according to claim 9,
wherein the through-hole has a cross-sectional shape that is substantially a rectangle having a pair of long-side portions facing each other and a pair of short-side portions facing each other,
wherein the permanent magnet is inserted into the through-hole in such a way that one end surface portion forming one magnetic pole faces one of the long-side portions of the through-hole and that the other end surface portion forming the other magnetic pole faces the other one of the long-side portions of the through-hole,
wherein when Lc denotes the length of the long-side portion of the through-hole and Lm denotes the length of the end surface portion of the permanent magnet, at least one of the pair of long-side portions of the through-hole satisfies the equation below $Lc \geq Lm$.

16. The permanent-magnet motor according to claim 9,
wherein the through-hole has a cross-sectional shape that is substantially a rectangle having a pair of long-side portions facing each other and a pair of short-side portions facing each other,
wherein the permanent magnet is inserted into the through-hole in such a way that one end surface portion forming one magnetic pole faces one of the long-side portions of the through-hole and that the other end surface portion forming the other magnetic pole faces the other one of the long-side portions of the through-hole, and wherein when Lc denotes the length of the long-side portion of the through-hole and Lm denotes the length of the end surface portion of the permanent magnet, one of the pair of long-side portions of the through-hole satisfies the equation below $Lc < Lm$.

\* \* \* \* \*